United States Patent
Hung

(10) Patent No.: US 9,477,052 B2
(45) Date of Patent: Oct. 25, 2016

(54) OPTICAL COMMUNICATION MODULE HAVING OPTICAL COUPLING LENS

(71) Applicant: HON HAI PRECISION INDUSTRY CO., LTD., New Taipei (TW)

(72) Inventor: Yi Hung, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 129 days.

(21) Appl. No.: 14/475,798

(22) Filed: Sep. 3, 2014

(65) Prior Publication Data

US 2016/0062060 A1    Mar. 3, 2016

(51) Int. Cl.
*G02B 6/38*    (2006.01)
*G02B 6/42*    (2006.01)
*G02B 6/43*    (2006.01)

(52) U.S. Cl.
CPC ............... *G02B 6/4214* (2013.01); *G02B 6/43* (2013.01)

(58) Field of Classification Search
USPC ....................................... 385/71–74
See application file for complete search history.

(56) References Cited

U.S. PATENT DOCUMENTS

| | | | | |
|---|---|---|---|---|
| 6,343,177 B1* | 1/2002 | Estoque | ............. | A61B 5/14552 385/139 |
| 8,360,659 B2* | 1/2013 | Krahenbuhl | ......... | G02B 6/3885 385/53 |
| 2009/0226137 A1* | 9/2009 | Abel | .................... | G02B 6/2817 385/71 |
| 2013/0251311 A1* | 9/2013 | Yu | ........................ | G02B 6/3807 385/74 |

\* cited by examiner

*Primary Examiner* — Eric Wong
(74) *Attorney, Agent, or Firm* — Zhigang Ma

(57) ABSTRACT

An optical communication module includes optical-electric conversion units, a coupling lens, and optical fibers. The coupling lens includes a first surface, a top surface, a second surface, first lens units on the first surface, and second lens units on the second surface. Each first lens unit is aligned with an optical-electric conversion unit. The top surface defines blind holes each having a reflection bottom surface. An optical axis of each first lens unit intersects an optical axis of a second lens unit on the reflection bottom surface. Each reflection bottom surface is concentrically aligned with a first lens unit and a second lens unit. Each second lens unit is aligned with an optical fiber.

17 Claims, 4 Drawing Sheets

OPTICAL COMMUNICATION MODULE HAVING OPTICAL COUPLING LENS

FIELD

The subject matter herein generally relates to fiber optic communication technologies, and particularly to an optical communication module having an optical coupling lens.

BACKGROUND

In the field of fiber optic communications, optical coupling lenses are common components. A typical optical coupling lens includes a light incident surface, a light emitting surface, a reflection bottom surface, a first lens unit, and a second lens unit. An included angle between the light incident surface and the light emitting surface is 90 degrees. An included angle between the light incident surface and the reflection bottom surface is 45 degrees. An included angle between the light emitting surface and the reflection bottom surface is also 45 degrees. The first lens is positioned on the light incident surface. The second lens is positioned on the light emitting surface. In use, a light transmitter is positioned towards the light incident surface and is aligned with the first lens unit. An optical fiber is aligned with the second lens unit. The light transmitter emits a light beam to the first lens unit. The first lens unit focuses the light beam into parallel light beam. The parallel light beam transmits to the reflection bottom surface and is reflected to the second lens unit by the reflection bottom surface. The reflected light beam is focused into the optical fiber by the second lens unit.

BRIEF DESCRIPTION OF THE DRAWINGS

Implementations of the present technology will now be described, by way of example only, with reference to the attached figures.

DETAILED DESCRIPTION

Figure 1:
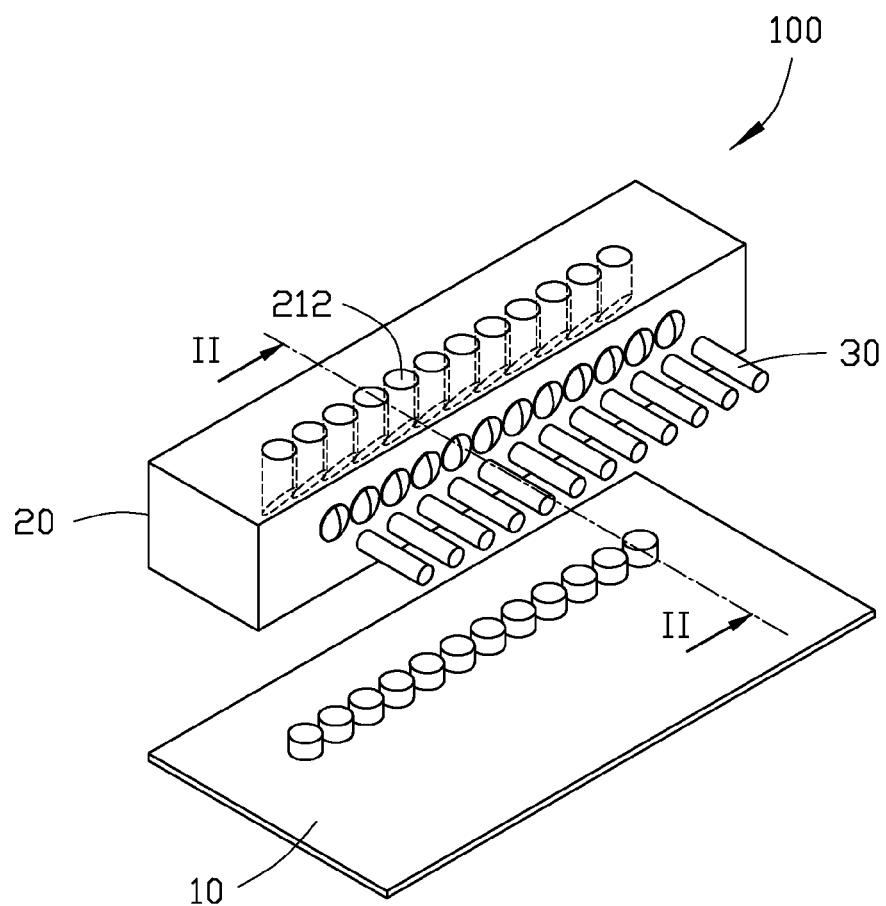
FIG. 1 is an isometric view of an embodiment of an optical communication module with an optical coupling lens.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising" means "including, but not necessarily limited to"; it specifically indicates open-ended inclusion or membership in a so-described combination, group, series and the like.

Figure 2:
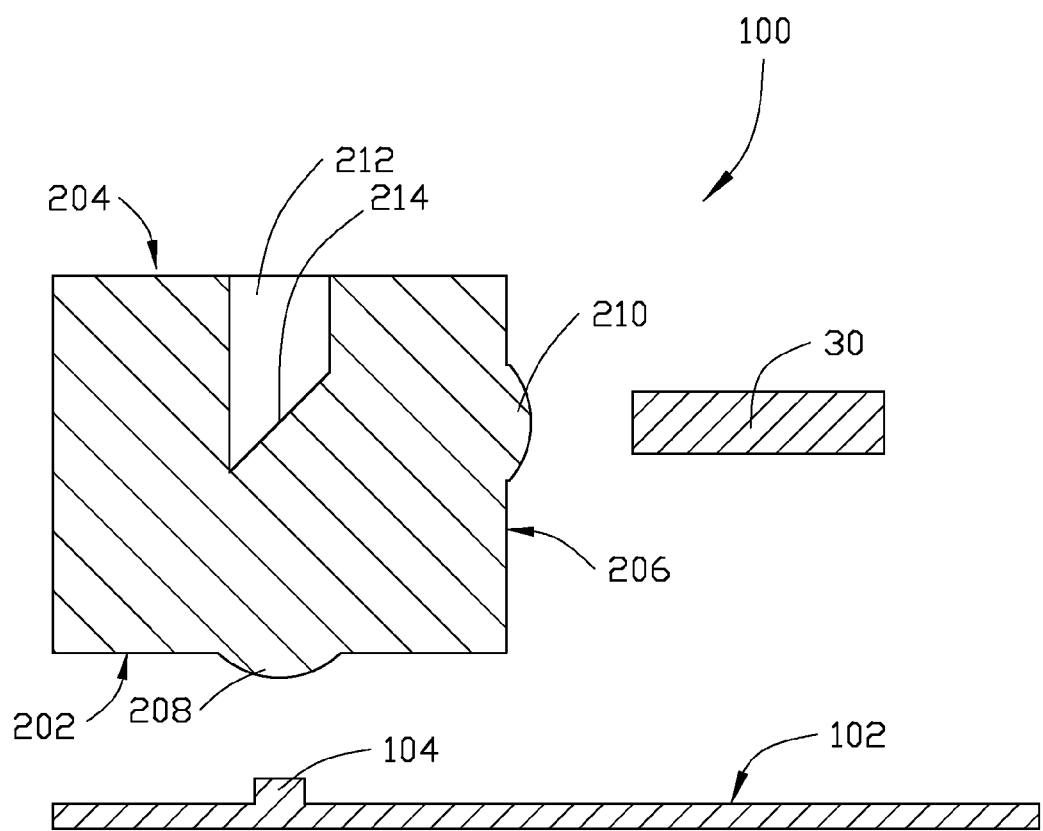
FIG. 2 is a cross-sectional view of the optical communication module of FIG. 1, taken along line II-II.

Referring to FIGS. 1 and 2, an embodiment of an optical communication module 100 includes a printed circuit board 10, an optical coupling lens 20, and a plurality of optical fibers 30.

The printed circuit board 10 includes a support surface 102 and a plurality of optical-electric conversion units 104. The optical-electric conversion units 104 are mounted on the support surface 102 and arranged in a straight line. The optical-electric conversion units 104 include optical transmitters and optical receivers. The optical transmitters can be laser diodes or light emitting diodes, for example. The optical receivers can be photo diodes, for example.

The optical coupling lens 20 includes a first surface 202, a top surface 204, a second surface 206, a plurality of first lens units 208, and a plurality of second lens units 210. The first surface 202 faces the support surface 102. The second surface 206 faces the optical fibers 30. An included angle between the first surface 202 and the second surface 206 is 90 degrees. The first lens units 208 are positioned on the first surface 202 and arranged in a straight line. Each of the first lens units 208 is aligned with a respective one of the optical-electric conversion units 104. The second lens units 210 are positioned on the second surface 206 and arranged in a straight line. Each of the second lens units 210 is aligned with a respective one of the optical fibers 30.

The top surface 204 is opposite to the first surface 202 and defines a plurality of cylindrical blind holes 212. The cylindrical blind holes 212 are arranged in one row. Each of the cylindrical blind holes 212 is perpendicular to the first surface 202 and has a reflection bottom surface 214. An included angle between the first surface 202 and the reflection bottom surface 214 is 45 degrees. An included angle between the reflection bottom surface 214 and the second surface 206 is also 45 degrees. An optical axis of each first lens unit 208 intersects with an optical axis of a corresponding one of the second lens units 210 on the reflection bottom surface 214. Each reflection bottom surface 214 is concentrically aligned with a corresponding one of the first lens units 208 and a corresponding one of the second lens units 210.

Figure 3:
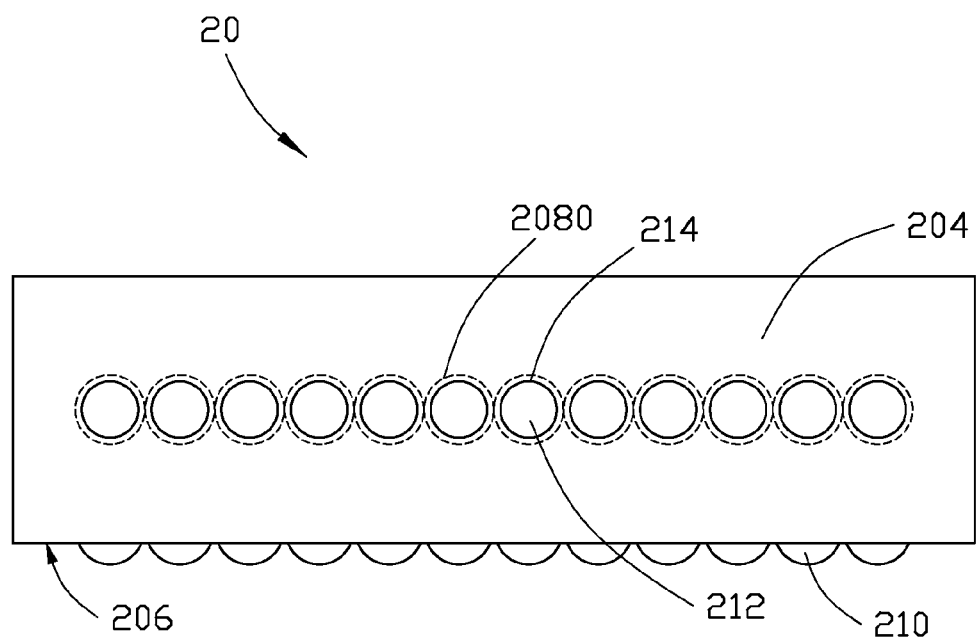
FIG. 3 is a top plan view of the optical coupling lens.
Figure 4:
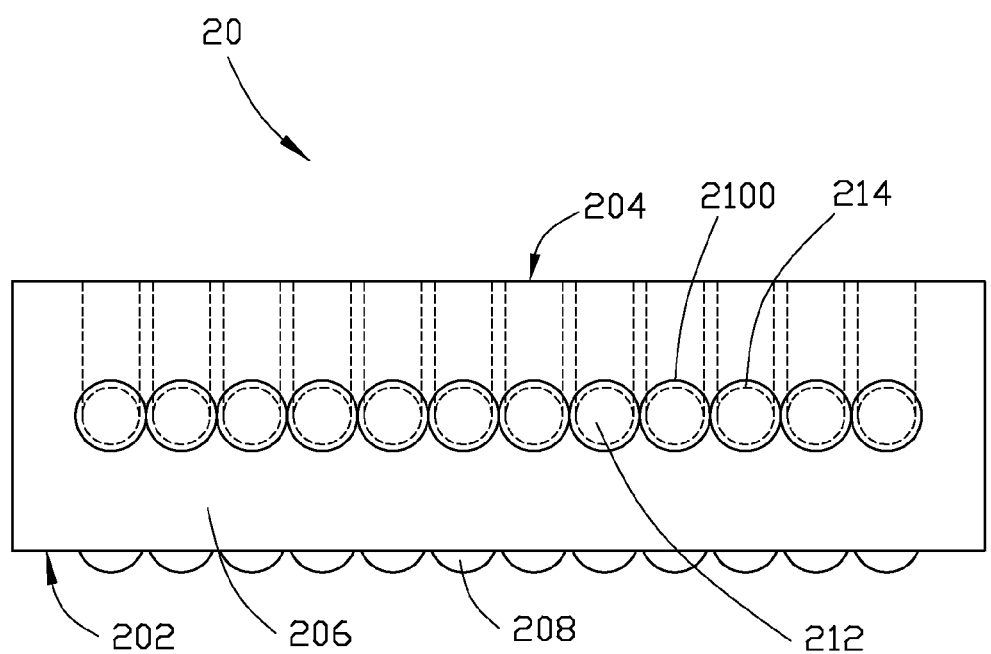
FIG. 4 is a front plan view of the optical coupling lens.

Referring to FIGS. 3 and 4, each of the first unit lens units 208 has a circular first bottom surface 2080 on the first surface 202. The circular first bottom surface 2080 has a radius $r_1$. Each of the second unit lens units 210 has a circular second bottom surface 2100 on the second surface 206. The circular second bottom surface 2100 has a radius $r_2$.

An orthogonal projection of each reflection bottom surface 214 on the first surface 202 is circular and has a radius $r_{ref}$. An orthogonal projection of each reflection bottom surface 214 on the second surface 206 is also circular and has the radius $r_{ref}$. The radius $r_{ref}$ follows conditions:

$$r_1 > r_{ref} > 0.8 r_1 \quad (1)$$

$$r_2 > r_{ref} > 0.8 r_2 \quad (2)$$

In the illustrated embodiment, the optical coupling lens 20 is substantially cubic shaped. The second surface 206 is directly connected to the first surface 202 and the top surface 204. The first lens units 208 and the second lens units 210 are all convex lenses.

In testing of the optical coupling lens 20, with reference to the reflection bottom surfaces 214, microscopes can be used to observe whether or not the first lens units 208 are optically aligned with the second lens units 210 in acceptable tolerance.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. An optical communication module comprising:
    a printed circuit board comprising a support surface and a plurality of optical-electric conversion units, the optical-electric conversion units mounted on the support surface;
    an optical coupling lens comprising a first surface, a top surface, a second surface, a plurality of first lens units, and a plurality of second lens units, the first surface facing the support surface, an included angle between the first surface and the second surface being 90 degrees, the first lens units positioned on the first surface, each of the first lens units aligned with a respective one of the optical-electric conversion units, the second lens units positioned on the second surface, the top surface opposite to the first surface and defining a plurality of blind holes, the blind holes being cylindrical shaped, each of the blind holes having a reflection bottom surface, an included angle between the first surface and the reflection bottom surface being 45 degrees, an included angle between the reflection bottom surface and the second surface being also 45 degrees, an optical axis of each first lens unit intersecting with an optical axis of a corresponding one of the second lens units on the reflection bottom surface, each reflection bottom surface concentrically aligned with a corresponding one of the first lens units and a corresponding one of the second lens units, the first lens units arranged in a straight line, and the second lens units are arranged in another straight line, the blind holes arranged in one row; and
    a plurality of optical fibers, the second surface facing the optical fibers, each of the second lens units aligned with a respective one of the optical fibers.

2. The optical communication module of claim 1, wherein each of the first unit lens units has a circular first bottom surface on the first surface, each of the second unit lens units has a circular second bottom surface on the second surface, an orthogonal projection of each reflection bottom surface on the first surface is circular, an orthogonal projection of each reflection bottom surface on the second surface is also circular.

3. The optical communication module of claim 2, wherein the circular first bottom surface has a radius $r_1$, the circular second bottom surface has a radius $r_2$, the orthogonal projection of each reflection bottom surface on the first surface has a radius $r_{ref}$, the orthogonal projection of each reflection bottom surface on the second surface has the radius $r_{ref}$, and the radius $r_{ref}$ follows conditions:

$$r_1 > r_{ref} > 0.8 r_1, \text{ and } r_2 > r_{ref} > 0.8 r_2.$$

4. The optical communication module of claim 1, wherein the blind holes are perpendicular to the first surface.

5. The optical communication module of claim 1, wherein the first lens units and the second lens units are convex lenses.

6. The optical communication module of claim 1, wherein the optical coupling lens is substantially cubic in shape, the second surface is directly connected to the first surface and the top surface.

7. The optical communication module of claim 1, wherein the optical-electric conversion units comprise optical transmitters and optical receivers.

8. An optical coupling lens, comprising:
    a first surface;
    a top surface, the top surface opposite to the first surface and defining a plurality of blind holes, the blind holes being cylindrical in shape, each of the blind holes having a reflection bottom surface, an included angle between the first surface and the reflection bottom surface being 45 degrees;
    a second surface, an included angle between the first surface and the second surface being 90 degrees, an included angle between the reflection bottom surface and the second surface being 45 degrees;
    a plurality of first lens units positioned on the first surface; and
    a plurality of second lens units positioned on the second surface, an optical axis of each first lens unit intersecting with an optical axis of a corresponding one of the second lens units on the reflection bottom surface, each reflection bottom surface concentrically aligned with a corresponding one of the first lens units and a corresponding one of the second lens units, the first lens units arranged in a straight line, the second lens units arranged in another straight line, the blind holes arranged in one row.

9. The optical coupling lens of claim 8, wherein each of the first unit lens units has a circular first bottom surface on the first surface, each of the second unit lens units has a circular second bottom surface on the second surface, an orthogonal projection of each reflection bottom surface on the first surface is circular, an orthogonal projection of each reflection bottom surface on the second surface is also circular.

10. The optical coupling lens of claim 9, wherein the circular first bottom surface has a radius $r_1$, the circular second bottom surface has a radius $r_2$, the orthogonal projection of each reflection bottom surface on the first surface has a radius $r_{ref}$, the orthogonal projection of each reflection bottom surface on the second surface has the radius $r_{ref}$, and the radius $r_{ref}$ follows conditions:

$$r_1 > r_{ref} > 0.8 r_1, \text{ and } r_2 > r_{ref} > 0.8 r_2.$$

11. The optical coupling lens of claim 8, wherein the blind holes are perpendicular to the first surface.

12. The optical coupling lens of claim 8, wherein the optical coupling lens is substantially cubic in shape, the second surface is directly connected to the first surface and the top surface.

13. The optical coupling lens of claim 8, wherein the first lens units and the second lens units are convex lenses.

14. An optical communication module, comprising:
a printed circuit board having a support surface with one or more optical electric conversion units mounted thereon; and
an optical coupling lens having one or more first lens units and one or more second lens units, with the optical coupling lens having a first surface, a top surface and a second surface, the first surface being substantially parallel to the top surface and the second surface being substantially perpendicular to both the top surface and the first surface;
wherein, the one or more first lens units are positioned on the first surface of the optical coupling lens, with at least one of the one or more first lens units being aligned with at least one of the one or more optical electric conversion units, and the one or more second lens units are positioned on the second surface of the optical coupling lens, with at least one of the one or more second lens units being alignable with an optical fiber; and
wherein, there is at least one or more blind holes defined from the top surface of the optical coupling lens with at least one of the one or more blind holes having a reflection bottom surface with the included angle between the reflection bottom surface and the first surface of the optical coupling lens being 45 degrees and the included angle between the reflection bottom surface and the second surface of the optical coupling lens being 45 degrees, the blind holes being cylindrical in shape; and
wherein, at least one of the one or more reflection bottom surfaces are positioned to concentrically align with at least one of the one or more first lens units and at least one of the one or more second lens units; and
wherein, an optical axis of one of the one or more first lens units intersects an optical axis of one of the one or more second lens units at the bottom reflection surface of one of the at least one or more blind holes, the first lens units arranged in a straight line, the second lens units arranged in another straight line, the blind holes arranged in one row.

15. The optical communication module of claim 3, wherein the blind holes are separated from and parallel to each other.

16. The optical coupling lens of claim 10, wherein the blind holes are separated from and parallel to each other.

17. The optical communication module of claim 14, wherein the blind holes are separated from and parallel to each other.

* * * * *